Dec. 12, 1933.　　　　G. A. SWARTZ　　　　1,938,942
AUTOMATIC MEASURING DEVICE
Filed April 18, 1930　　　2 Sheets-Sheet 1
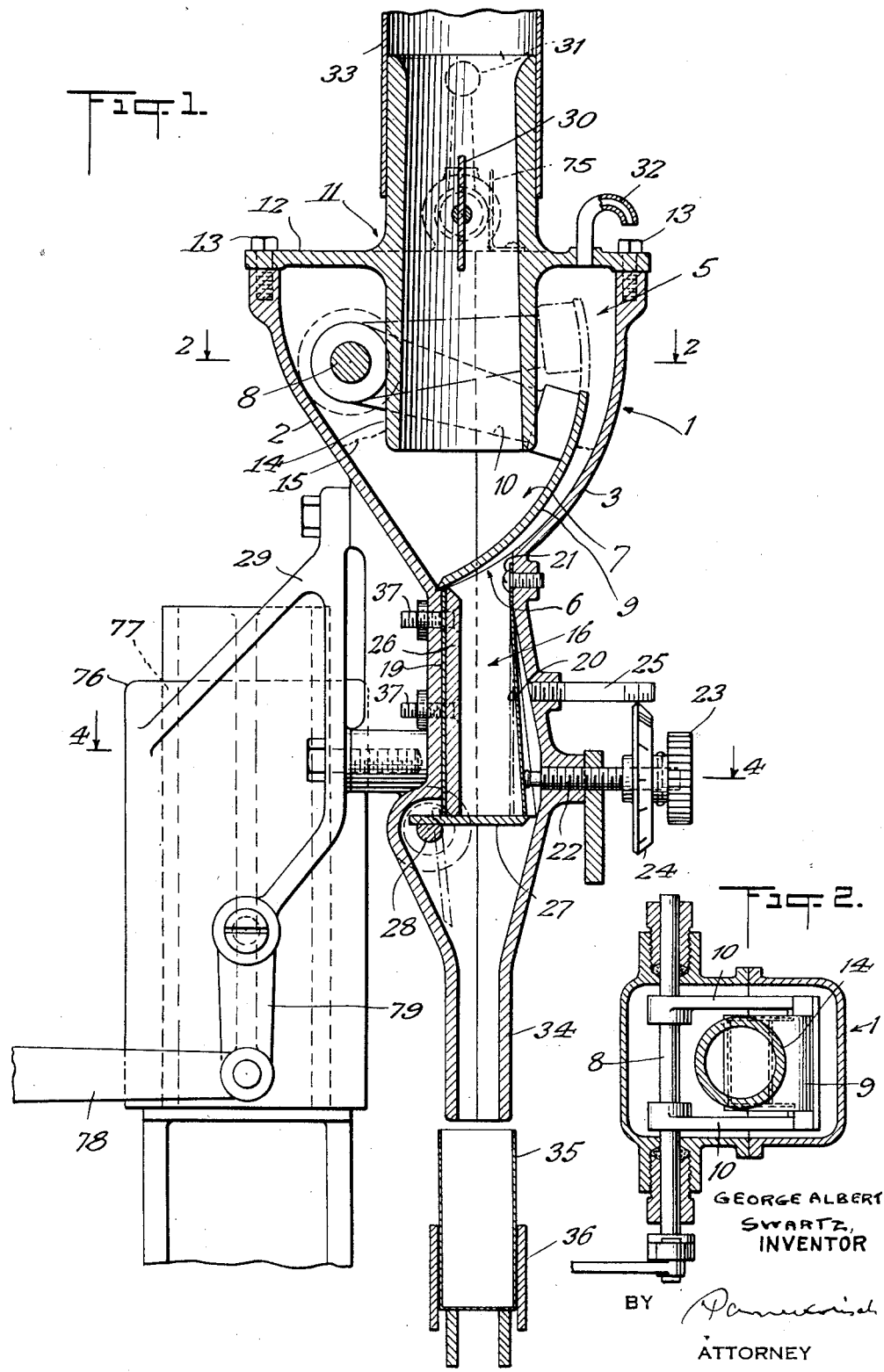
GEORGE ALBERT SWARTZ, INVENTOR
BY
ATTORNEY Dec. 12, 1933.　　　G. A. SWARTZ　　　1,938,942
AUTOMATIC MEASURING DEVICE
Filed April 18, 1930　　　2 Sheets-Sheet 2
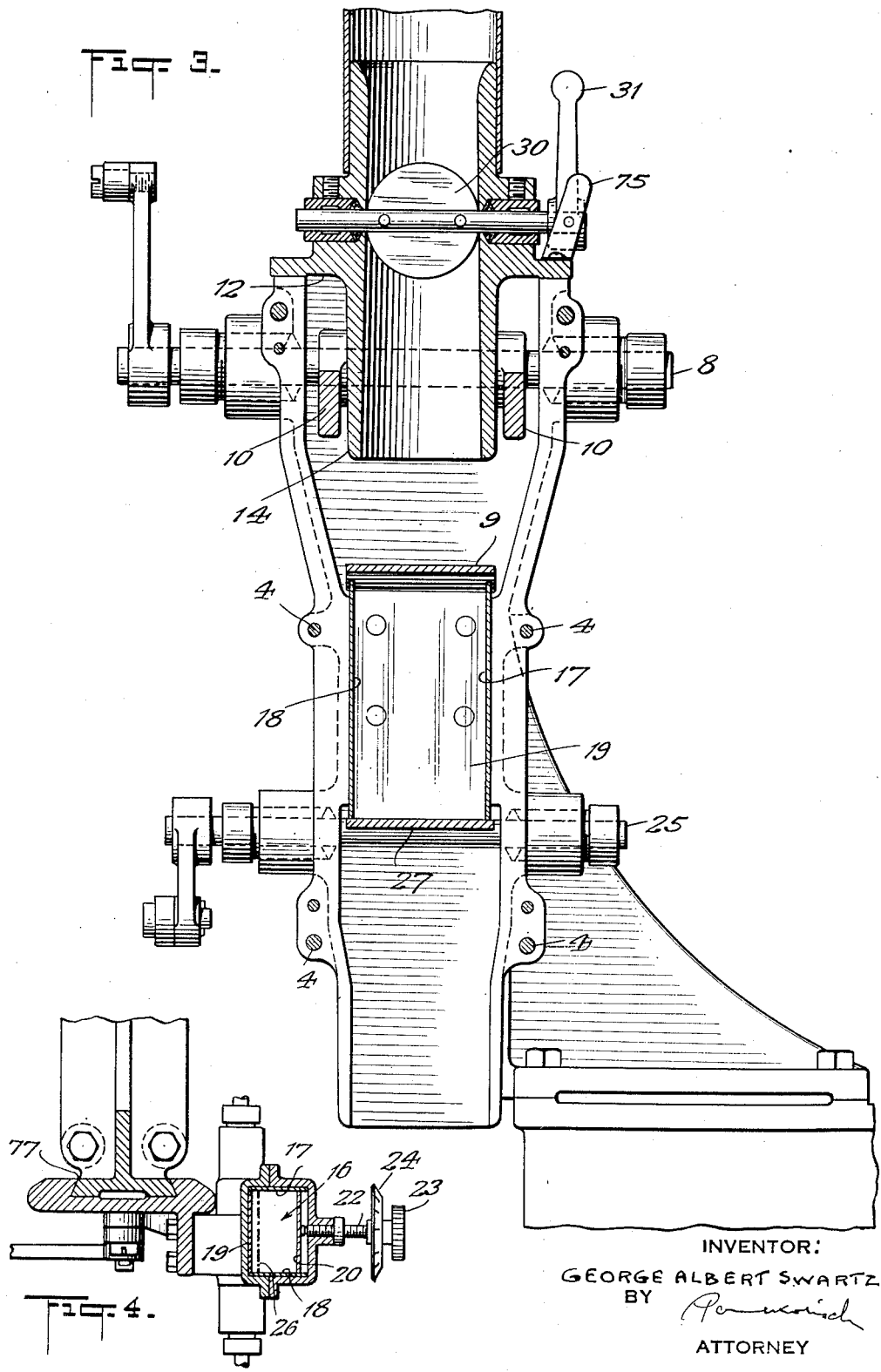
INVENTOR:
GEORGE ALBERT SWARTZ
BY
ATTORNEY Patented Dec. 12, 1933

1,938,942

UNITED STATES PATENT OFFICE 1,938,942

AUTOMATIC MEASURING DEVICE

George Albert Swartz, Westwood, N. J., assignor, by mesne assignments, to American Machine and Metals, Inc., New York, N. Y., a corporation of Delaware Application April 18, 1930. Serial No. 445,424

2 Claims. (Cl. 221—111)

This invention relates to automatic measuring devices.

It is an object of my invention to provide a mechanism which is adapted to measure at a high rate of speed given quantities of powdered material.

A further object is the provision of a pocket or chamber for measuring material, which pocket is provided with adjustable means whereby the capacity thereof may be varied at will.

In accordance with my invention I construct an automatic measuring mechanism having a main casing or housing comprising a reservoir, a measuring pocket, and specially arranged valves for controlling the flow of material from the reservoir to the measuring pocket or chamber and for controlling the flow of material from said chamber. One side of the measuring pocket or chamber is fixed at one end and movable at the other, and means is provided for moving the free end of that side so as to vary the dimensions of the pocket within predetermined limits. This movable side is preferably made in the form of a spring plate securely fixed at one end and sufficiently resilient to hold itself in one extreme position. However, the plate might be made of rigid material and hingedly secured at one end if desirable. A rock shaft is furnished for operating the valve which is positioned between the reservoir and measuring chamber, and for supplying the reservoir with powdered material, a nozzle or spout is provided. This spout is made to project below the level of the rock shaft far enough so that the powdered material entering the reservoir through the spout fills the bottom part of the reservoir up to the level of the spout opening and thereby stops the flow of additional powder from the spout before the powder in the reservoir rises to the level of the rock shaft. By such an arrangement as this the bearing of the shaft is kept above the level of the powder and entirely free therefrom so that no jamming of the bearing results.

The above mentioned and other objects and advantages and the manner of obtaining them will be made clear in the following description and accompanying drawings.

In the drawings, Fig. 1 is a sectional side elevation view of a measuring machine constructed in accordance with my invention.

Fig. 2 is a sectional view taken along the line 2—2 of Fig. 1.

Fig. 3 is a front view of the machine with a portion of the casing thereof removed and certain parts in section.

Fig. 4 is a sectional view taken along line 4—4 of Fig. 1.

Referring more particularly to the drawings, reference numeral 1 indicates generally a housing consisting of two enclosure elements 2 and 3 which are clamped together by means of cap screws 4. These two elements are enlarged at the top part to form a reservoir 5, which is tapered towards the bottom and furnished with an outlet opening 6. For closing this opening a valve 7 operated by a rock shaft 8, is furnished. This valve comprises a curved plate 9 carried by an arm 10 secured to the rock shaft 8. The curvature of the plate 9 is such that it conforms to the arc of a circle, the center of which is the shaft 8. The adjacent wall of the casing which forms the reservoir is curved along a different arc in such manner that the valve plate 9, when in its closed position covering the opening 6, is quite widely spaced from the wall of the reservoir at a point remote from the opening 6. This construction insures free opening and closing movement of the valve while the machine is being used. For conducting material into the reservoir an inlet pipe 11 is furnished. This pipe has a flange 12 which serves as a cover for the reservoir and which is fastened by means of a cap screw 13 to the two elements 2 and 3 in substantially air-tight fashion. This pipe has a downwardly extending spout or nozzle 14 which projects within the reservoir to a position below the shaft 8. This arrangement of the spout, in conjunction with the tapering side walls of the reservoir, prevents powder from reaching the bearing of the shaft 8 where the shaft extends through the side of the casing. Powder entering the reservoir descends through the spout 14 filling the bottom part of the reservoir and rising to the level of the end of the spout, thereby retarding the flow of powder therefrom. A small additional amount of powder may continue to force itself into the reservoir but because of the limited fluidity of the material this additional amount will be small. Some material will be forced up above the level of the opening of the spout but the final level of the material will be below the shaft bearing, as shown in dotted lines at 15. A butterfly valve 30 is positioned in the pipe 11 and provided with an operating handle 31 so that the entry of powder into the reservoir may be stopped at any time for repairing or cleaning of the device. The spring 75 is for holding the valve either open or closed. It cooperates with a seat made for it on part of handle 31. Flange 12 as stated above is held tight on the top of the casing by cap screws 13. This insures that dust will not escape from the reservoir while the machine is in operation. For enabling the quick entry of powder into the reservoir a vent pipe 32 is furnished which permits any accumulated air to escape. Immediately below the reservoir is a measuring pocket or chamber 16.

This pocket is lined by a pair of side plates 17 and 18, a back plate 19 and a front plate 20. This front plate is preferably of resilient material and fastened securely at one end only, as shown at 21, the other end being free to move under the influence of an adjusting screw 22. If desirable the plate 20 might be made of rigid material and be hinged at 21 to the member 3. In such case the plate would have to be suitably connected to the end of the screw 22 so as to move backward and forward in response to adjustment of the screw. In the present case, however, the plate 20 is made resilient and so shaped that it normally bends towards the screw 22. This insures that as the screw is moved outwardly the plate will follow it thereby enlarging the inside dimension of the measuring pocket or chamber 16. For operating the screw 22 a knob 23 is furnished and for calibrating the capacity of the chamber a dial 24 is fixed to the screw and an indicator 25 is fixed to the casing. Suitable identifying marks are provided both on the dial and on the indicator. As an additional means of varying the size of the measuring pocket 16, a series of filler or displacement plates may be provided. One of these is shown at 26, which plate is held in position by means of screw 37. This plate serves merely to take up a part of the inside space of the chamber thereby reducing the amount of material which can be retained therein. By substituting for 26 a plate of different dimensions, the capacity of the chamber 16 may be varied. Large variations in capacity may be secured by changing the plate 26 while the movable plate 20 serves as a sort of vernier adjustment. The flow of material from the chamber is controlled by a valve plate 27 carried by a rock shaft 28 journalled in the casing.

The entire measuring mechanism may be supported by some suitable bracket such as 29. In the present case this bracket is made vertically extensible so that the entire measuring mechanism can be raised and lowered as a unit. Such motion is useful where it is desired to thrust the discharge spout nozzle of the measuring chamber, into a carton or bag to be filled so as to prevent loss of the filling material. As illustrated the bracket 29 is slidably coupled to a stationary stand 76, by a dove tail joint 77, and is adapted to be moved up and down by a lever arm 78, to which it is connected by a link 79. The arm 78 may be raised and lowered by any suitable well known mechanism, such as a cam, in proper time relationship to the operation of the valves 7 and 27.

It will be noted that because of the split arrangement of the casing, the operating parts of the mechanism may be quickly and easily exposed for cleaning. It is merely necessary to remove certain of the cap screws 13 and cap screws 4, thereby permitting the front plate 3 to be taken off. This removal exposes the valve 7, pocket 16 and valve 27 and permits a thorough cleaning to be made quickly and easily. The front plate 20, which normally is positioned between the two side plates 17 and 18, as best shown in Fig. 4, is removed with the member 3 thereby leaving the measuring pocket or chamber entirely open so that any material which may have accumulated in the corners may be cleaned out.

In operation, powder is conducted to the machine from a suitable source of supply by means of a conduit 33 whence it travels past the valve 30 through the spout 14 into the reservoir 5. It quickly falls to the bottom part of the reservoir until the end of the spout is covered somewhat whereupon the fluid friction prevents entry of more powder. The valve 7 is then opened by any suitable means allowing a quantity of the powder to drop into the chamber 16 and fill it completely. The valve 7 is then closed so as to prevent any more powder from entering the chamber. After such closure, valve 27 is opened by rocking the shaft 28 and permits the measured quantity of powder within the chamber to run down the discharge nozzle 34 into a container 35. Where the measuring device is used in conjunction with an automatic packaging machine the valves 7 and 27 would be operated at their proper intervals by cams carried by the machine drive shaft and the container 35 would be moved along the conveyor 36 by any suitable means. In order to prevent escape of powder from the container during the filling operation the entire measuring mechanism may be raised and lowered on the stand 76 by vertical movement of lever 78.

For securing small and extremely accurate adjustments of the measuring capacity of chamber 16 the screw 22 may be turned, thereby causing the plate 20 to move to a new position. The correct setting for any particular volume will be shown by the marks carried by dial 24 and indicator 25. Where a large charge is necessary in the capacity of the chamber the filler or displacement plate 26 may be removed and one of different dimensions substituted therefor.

What I claim is:

1. A device for measuring powder comprising a casing having a reservoir and a chamber, a valve between said reservoir and chamber, a shaft for operating said valve passing through the wall of said reservoir, an inlet spout extending downwardly into said reservoir with its mouth below the level of said shaft so that powder entering said reservoir through said spout is prevented from reaching the level of said shaft.

2. A device for feeding measured quantities of powdered material at high speed, comprising a casing having a reservoir, a measuring chamber below said reservoir, a thin blade rotary valve mounted within said reservoir for controlling the flow of material from said reservoir to said measuring chamber, a rock shaft passing through the wall of said reservoir for actuating said valve, a rockably mounted plate valve for the bottom of said chamber, inlet means for said reservoir comprising a vertically arranged spout having a portion extending into said reservoir to a point below the level of said rock shaft, said spout forming a tight joint with said reservoir, and a small air vent for permitting the escape of air from said reservoir.

GEORGE ALBERT SWARTZ.